Aug. 10, 1971  D. J. BEECHER  3,598,517
AUTOMATIC CONTROL FOR BALANCED PRESSURE PROCESS
Filed May 12, 1969
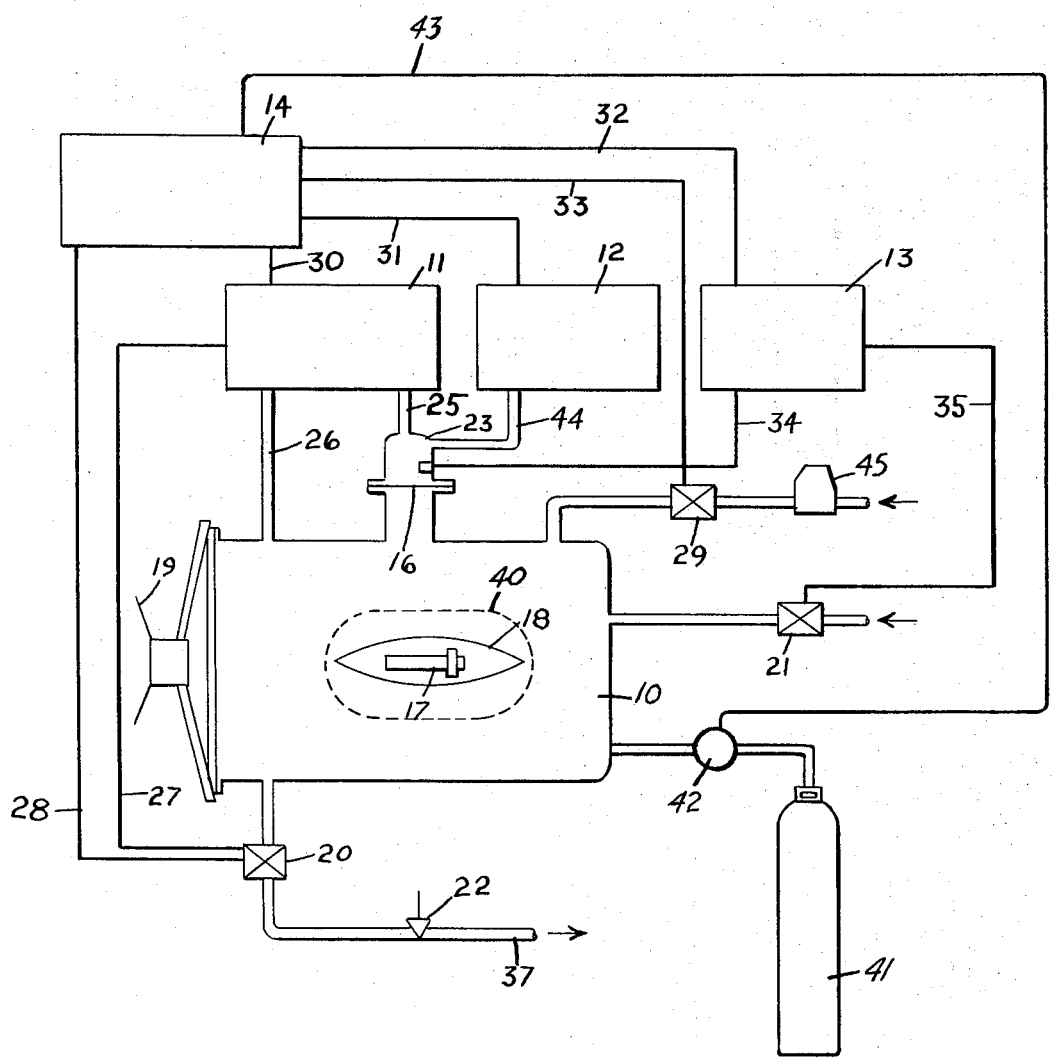
INVENTOR
DONALD J. BEECHER
BY Charles L. Lovercheck
ATTORNEY

United States Patent Office 3,598,517
Patented Aug. 10, 1971

3,598,517
AUTOMATIC CONTROL FOR BALANCED PRESSURE PROCESS
Donald J. Beecher, Erie, Pa., assignor to American Sterilizer Company, Erie, Pa.
Filed May 12, 1969, Ser. No. 827,471
Int. Cl. A61l 1/00, 13/00
U.S. Cl. 21—58    11 Claims

ABSTRACT OF THE DISCLOSURE

A process and apparatus for sterilizing articles sealed in packages made of semi-permeable membranes, and with or without porous overwrap, in a sealed chamber in an atmosphere of permeable gas. A control is provided for regulating the pressure in the chamber to limit the differential pressure between the pressure inside the package and the pressure in the chamber to a predetermined value so that the pressure inside the package will never be such as to rupture the package and the chamber pressure will not exert a pressure on the outside of the package which might damage its contents. The sterilizing gas is an epoxide, preferably ethylene oxide.

CROSS REFERENCE TO RELATED APPLICATIONS

Patent application, Ser. No. 730,311, of Donald A. Gunther, filed May 20, 1968, discloses a balanced pressure method of sterilizing to protect packages wrapped in semi-permeable membrane. The present invention discloses a method of controlling the differential between the pressure inside a semi-permeable package and in a sterilizing chamber around the package during a sterilizing cycle by means of a diaphragm in a control made of the same material or combination of materials as the wrapper of the package.

BACKGROUND OF INVENTION

This invention relates to sterilizing cycles and, more particularly, to sterilizing articles packaged in sealed, semi-permeable packages.

DESCRIPTION OF PRIOR ART

Many efforts have been made to provide optimum cycles for sterilizing articles in semi-permeable packages but none of them have been able to provide an optimized cycle controlling the differential between the pressure inside the package and outside the package.

SUMMARY OF INVENTION

The sterilization of disposable and similar articles many times involves items packaged in plastic films. Packaging and heat-sealing of the envelope itself is usually a production process prior to sterilization.

Subjecting these packages to high vacuum or high pressure could result in rupturing the package film and/or damaging the contents. The plastic film used represents a barrier to water but is permeable to sterilizing atmosphere of gas. This combination provides a relatively high integrity package providing it is rupture-free yet can be readily permeated by ethylene oxide or a suitable sterilant. The balanced pressure sterilizing cycle referred to above in the Gunther application was developed to guard against damaging the plastic envelope or package by a combination of permeable gases and impermeable gases.

The purpose of this disclosure is to optimize the cycle of a balanced pressure system by controlling the cycle in accordance with the characteristics of the packaging film and/or the other packaging material being used. Many commercial operations involve repetitive cycles of uniform production loads.

When articles are heat-sealed in plastic films, air is trapped in the package. The sterilant, as an example ethylene oxide gas, permeates the package and is diluted by the entrapped air. The time for diffusion of the gas through the film is an important time element in the overall cycle and varies with the characteristics of the plastic film used for packaging. The diffusion time is also a function of the characteristic of the package.

Moisture is an important element in whether or not sterilization occurs in the gas cycle. The method of moisturizing a load disclosed herein is to either measure the actual humidity present in the chamber or to bleed steam into the chamber for a predetermined period of time and measure pressure temperature relations present within the chamber. In all cases, the chamber environment is being monitored.

One purpose of the present disclosure is to describe a different method of determining moisture content that is more closely related to the actual load condition. The moisture in the load sensor is indicative of the moisture environment of the load. It will be isolated from the chamber atmosphere by the separating membrane which can be plastic or a combination material. The membrane for sensing moisture could be either the load overwrap or the plastic film or both. The moisture detecting equipment would be a part of the control system in the same manner as an ethylene oxide detector discussed. Conditioning of the load would continue until the moisture monitoring equipment detected the predetermined level desired. At that time, the conditioning process would stop. When the ethylene oxide monitoring equipment detected the proper ethylene oxide level, the exposure cycle would begin. The cycle would, thus, be optimized from a moisture conditioning standpoint in the load, and likewise the pressure around the package and inside the chamber would be optimized relative to the pressure inside the package. The humidity and the ethylene oxide concentration could and probably would be different than that detected and controlled in the load sensor-simulator.

OBJECTS OF THE INVENTION

It is, accordingly, an object of the invention to provide an improved sterilizing cycle.

Another object of the invention is to provide an improved apparatus for sterilizing in a gas atmosphere.

Another object of the invention is to provide a control including a load humidity sensor, which has similar humidity absorption characteristics to the load.

Another object of the invention is to provide a control including an ethylene oxide detector which will simulate the ethylene oxide in the load.

Another object of the invention is to provide a sterilizing system wherein the pressure around the package and inside the chamber would be optimum relative to the pressure inside the package.

DESCRIPTION OF THE DRAWINGS

The figure schematically illustrates the sterilizing system to be employed to carry out the invention.

DETAILED DESCRIPTION OF THE DRAWING

Now with more particular reference to the drawing a sterilizing chamber or autoclave is indicated generally at 10. This may be any suitable type of autoclave familiar to those skilled in the art and have a removable door held in place by the lock mechanism 19. For example, the autoclave could be of the general type shown in U.S. Pat. No. 3,068,064.

The load in the chamber indicated will be, for purposes of this discussion, an article 17 packaged in a semi-permeable membrane 18 and having an overwrap 40 of material such as cotton textile. The diaphragm 16 in the load sensor 23 will be removable by suitable clamping mechanism by which the diaphragm will be clamped between the flanges shown. In instances where humidity alone is to be controlled or where no semi-permeable membrane is used to wrap the package, the membrane 16 will be made of the same material as the overwrap material 40. The membrane could also be made of the same material as the semi-permeable material 18 in which the article is packaged or a composite diaphragm made of the overwrap and the semi-permeable material could be used.

Examples of semi-permeable packagaing materials

Cellophane
Polyethylene
Vinyl

Examples of overwrap materials

Cotton textile
Kraft paper
Cardboard
Wrapping paper
Synthetic textile

The main control

The main control 14 will be a type familiar to those skilled in the art. The main control will be connected to the solenoid valve 20 by means of the electrical line 28 and it wil be connected to the pressure differential control 11, the gas monitor 12, to the humidity monitor 13, and to the solenoid valve 29 by means of the electrical lines 30, 31, 32, and 33 respectively. Control 14 controls valve 42 through line 43 to admit gas to the chamber from gas supply 41.

The pressure differential control

The pressure differential control 11 will be of a type familiar to those skilled in the art. The pressure will be connected to the load sensor 23 by means of the sampling line 25 and it will be connected to the chamber 10 by means of a line 26 and electrically connected to the solenoid valve 20 by means of electrical line 27 and to the main control by electrical line 30.

The gas monitor

The gas monitor 12 will be of a type familiar to those skilled in the art. The gas monitor will be connected to the main control 14 by electrical line 31 and to the load sensor 23 by sampling line 44 to control the gas in the chamber from bottle 41 and valve 42 controlled by line 43 from the main control.

Drain line

A suitable drain line 37 will be connected to a suitable drain and an evacuating pump (not shown) may be connected in this line. A flow regulator 22, as well as the solenoid valve 20, will be connected between the chamber 10 and the line 37.

The humidity monitor

The humidity monitor will be of a type familiar to those skilled in the art. The humidity monitor 13 will be connected to the load sensor 23 by means of the electrical line 34 and to the solenoid valve 21 by means of the line 35.

At the beginning of a production sterilization cycle, the operator will insert a section of material like packaging film 18 or a section of material like overwrap 40, or a combination of the two, into the diaphragm area to replace the diaphragm 16. The operator will then select two pressure differentials to be used; one of the pressure differentials will be a pressure differential that will limit the maximum internal package pressure protecting against rupture of the package material itself, or the strength of the heat seal that closes the package.

The other will be a pressure differential between the chamber pressure and the pressure inside the package which will limit the crushing pressure exerted on the outside of the package by pressure in the chamber around the package. These two pressure differentials will be set on the main control 14.

Any of the ordinary sterilizing gases may be used, for example, ethylene oxide-Freon mixture may be used. A desirable gas concentration level will then be selected on the main control 14 which at the same time will program the required sterilization time. The pressure differential control 11 controls the flow of gas into the chamber from valve 42 at a rate that will not allow the pressure to exceed the established parameters.

Since diaphragm 16 is made of the same material or combination of materials as package 18 and overwrap 40, gas will permeate the diaphragm at a similar rate as it permeates the package.

Ethylene oxide gas will then be charged into the chamber and regulated by the ethylene oxide monitor to bring the chamber to a predetermined pressure, which is correlated to produce an ethylene oxide concentration equal to, or slightly in excess of, the selected level. When the ethylene oxide gas monitor detects the desired concentration, a signal is sent to the main control 14 which starts the timing of the exposure period. This may or may not be related to humidity conditions.

When the elasped time period of the sterilization is completed, the main control opens and the air supply solenoid valve 29 is opened by the main control and the exhaust solenoid valve 20 is likewise opened. This action is for a timed period with the purpose of flushing the chamber of ethylene oxide gas mixture out and introducing air. The air pressure regulator 45 has a flow capacity less than that being exhausted such that, it will maintain the chamber pressure the same as or less than that during the sterilization exposure period. If it is less than during the sterilization exposure, it is controlled to be no less than the pressure differential selected at the start of the cycle.

At the end of the timed air flush cycle, the air supply solenoid and the chamber exhaust solenoid valves are closed and the pressure differential control again takes command of the cycle. This control reads two pressure sampling lines. One line 26 is sampling the chamber pressure which is essentially an air atmosphere. The second sampling line 25 is reading pressure in the load simulator chamber which is the sum of the partial pressures of the original trapped air plus sterilant gas partial pressures.

As the ethylene oxide gas diffuses back across the plastic film membrane into the chamber from the load simulator chamber, the pressure in the load simulator drops. As this drops, the pressure differential control reduces chamber pressure by opening the chamber exhaust valve. When the pressure difference between ambient atmosphere and the load simulator chamber is equal to the tolerable pressure of the package as preset in Step 1, the control signals cycle complete and the chamber pressure is reduced to zero.

The humidity monitor 11, gas monitor 12 and main control 14 will be of types well known to those skilled in the art, for example, as shown by Pats. 3,068,064, and 3,042,533.

I claim:
1. A method of sterilizing articles, that are sealed in packages made of semi-permeable membranes, in an atmosphere of an epoxide sterilizing gas comprising
placing said packages containing said articles in a sealed chamber,
admitting said epoxide sterilizing gas to said chamber until the concentration of said gas in the chamber reaches a predetermined value, said membranes being permeable to said gas,
holding said concentration of said gas at said predetermined value for a predetermined time period,
simulating the pressure within the article package by providing a cavity in fluid-flow communication with said chamber and having a section of semi-permeable material disposed therebetween to form a semi-permeable barrier to fluid flow therebetween, said material having the same permeability characteristics as said membranes, continuously measuring both the pressure in said chamber and the pressure in said cavity, continuously controlling the pressure differential between said measured pressures to less than a predetermined value by utilizing said differential pressure to control the flow of gas into and out of said chamber, and removing said gas from said chamber.

2. The method recited in claim 1 wherein said differential control is also used to control the flow of gas from the chamber after said predetermined time period.

3. The method recited in claim 1 wherein the sterilizing gas is ethylene oxide.

4. An apparatus for sterilizing articles contained in sealed packages made of semi-permeable material comprising a sealed sterilizing chamber, a source of an epoxide sterilizing gas, said material being permeable to said gas, a control cavity;

means operatively connecting said chamber and said cavity for fluid flow therebetween;

means connecting a sheet of a semi-permeable material in said fluid-flow connection means between said control cavity and said sealed chamber to provide a semipermeable barrier therebetween;

means for measuring the pressures in both said chamber and said cavity, and a control means actuated by the pressure differential between said chamber and said cavity to control the flow of said gas to said chamber in such a fashion as to alleviate said pressure differential, said differential pressure being created by said gas permeating said sheet of material and building up an over-pressure in said cavity relative to the pressure in said chamber.

5. The apparatus recited in claim 4 wherein said material connection means comprises opposing flanges on said chamber and said cavity between which said sheet of material is mounted.

6. The apparatus recited in claim 4 wherein said semi-permeable material is permeable to water vapor.

7. The apparatus recited in claim 6 wherein said material has the same permeability characteristics as the semi-permeable material of said package.

8. An apparatus for sterilizing articles packaged in semi-permeable material comprising a sealed autoclave, means to admit an epoxide sterilizing gas to said autoclave, control means to control the flow of said gas to said autoclave, said control means comprising a pressure differential control, a load sensor, said load sensor having a cavity therein, said cavity being connected in fluid flow relationship to said chamber, means connecting a section of semi-permeable material between said chamber and said cavity to provide a semipermeable barrier therebetween, both said package material and said section of material being permeable to said gas, means connecting said pressure differential control to said cavity and to said chamber whereby said differential control senses the difference in pressure between the pressure in said cavity and the pressure in said chamber, and means connected to said differential control and to said gas admitting means to control the flow of said gas to said chamber.

9. The apparatus recited in claim 8 wherein said package is made of a material permeable to water vapor and said gas.

10. The apparatus recited in claim 8 wherein said gas is ethylene oxide.

11. The apparatus recited in claim 8 wherein an evacuating pump is connected to said autoclave.

References Cited

UNITED STATES PATENTS

| | | | |
|---|---|---|---|
| 2,398,082 | 4/1946 | Cavallito | 21—56UX |
| 2,536,115 | 1/1951 | Wilbur | 21—56UX |
| 2,868,616 | 1/1959 | Poitras | 21—56 |
| 2,917,878 | 12/1959 | Carnarius et al. | 21—58UX |
| 3,068,064 | 12/1962 | McDonald | 21—58 |
| 3,093,449 | 6/1963 | Kotarske et al. | 21—56X |
| 3,481,691 | 12/1969 | Trainham | 21—94 |
| 3,481,688 | 12/1969 | Craig et al. | 21—56 |
| 3,482,930 | 12/1969 | Huber | 21—56 |

MORRIS O. WOLK, Primary Examiner

B. RICHMAN, Assistant Examiner

U.S. Cl. X.R.

21—91, 103